United States Patent [19]

Nakamura et al.

[11] Patent Number: 4,989,659
[45] Date of Patent: Feb. 5, 1991

[54] PNEUMATIC RADIAL TIRE WITH A DIVIDED BELT LAYER

[75] Inventors: Yoichi Nakamura, Kodaira; Akira Tamura, Iruma; Akihito Goto, Kodaira, all of Japan

[73] Assignee: Bridgestone Corporation, Tokyo, Japan

[21] Appl. No.: 288,937

[22] Filed: Dec. 23, 1988

[30] Foreign Application Priority Data

Dec. 28, 1987 [JP] Japan ................ 62-335334

[51] Int. Cl.$^5$ .................. B60C 9/30; B60C 9/18
[52] U.S. Cl. ................... 152/534; 152/535; 152/538
[58] Field of Search ............ 152/534, 538, 535, 536, 152/526

[56] References Cited

U.S. PATENT DOCUMENTS

| | | | |
|---|---|---|---|
| 3,335,777 | 8/1967 | Hutch | 152/535 |
| 3,677,319 | 7/1972 | Mirtain | 152/531 X |
| 4,244,415 | 1/1981 | Peter et al. | 152/538 X |
| 4,865,103 | 9/1989 | Kobayashi et al. | 152/538 X |

Primary Examiner—Michael W. Ball
Assistant Examiner—Gregory J. Wilber
Attorney, Agent, or Firm—Sughrue, Mion, Zinn, Macpeak & Seas

[57] ABSTRACT

A pneumatic radial tire includes a carcass anchored to a pair of beads, and laminated belts having at least two belt layers circumferentially extending outside of a crown portion of the carcass and consisting of cords intersecting between adjacent belt layers. One of the laminated belts is divided in circumferential directions of the tire into a center portion and two side portions. A divided width A of the divided belt from its center to its divided points has a relation $$W/4 \leq A < W$$

where R is a half of a width of another laminated belt. Directions of cords of the center portion and the side portions of the divided belt are substantially the same, while cord angles αout of the cores of the side portions of the divided belt with the circumferential directions are larger than cord angles αc of the center portion of the divided belt with the circumferential directions.

13 Claims, 9 Drawing Sheets

FIG_2a
PRIOR ART
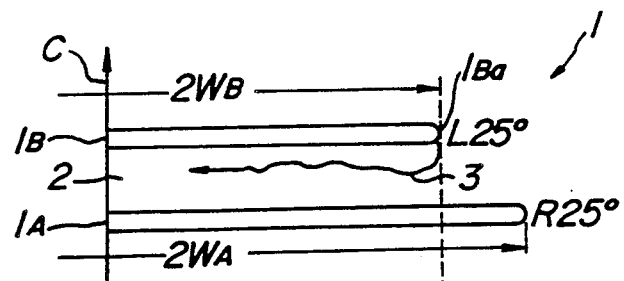
FIG_2b
PRIOR ART
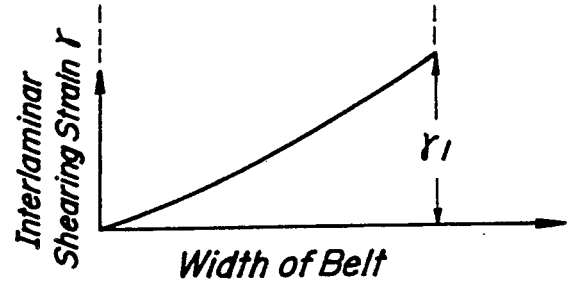
FIG_3a
PRIOR ART
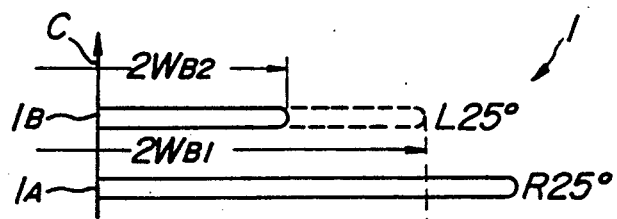
FIG_3b
PRIOR ART
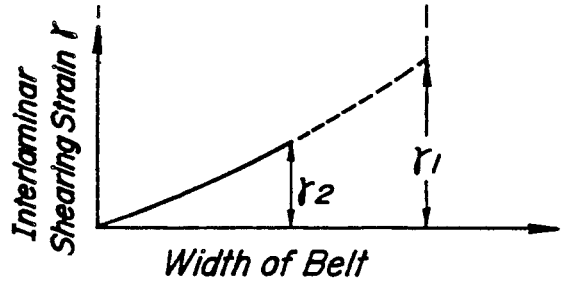

FIG. 4a
*PRIOR ART*
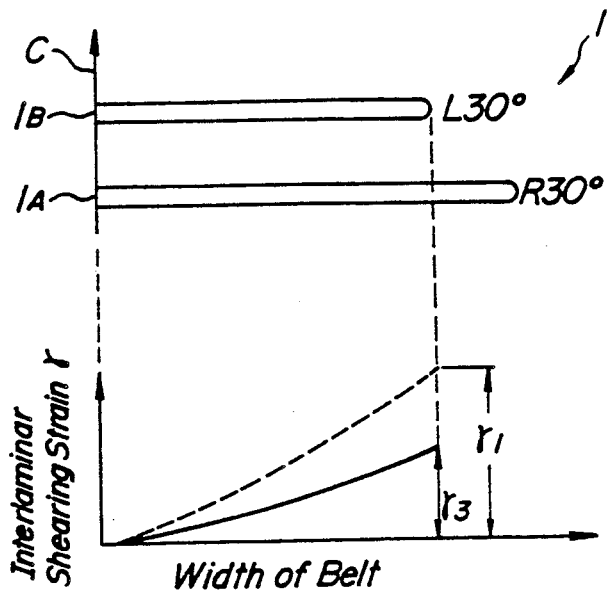
FIG. 4b
*PRIOR ART*
FIG. 5 PRIOR ART
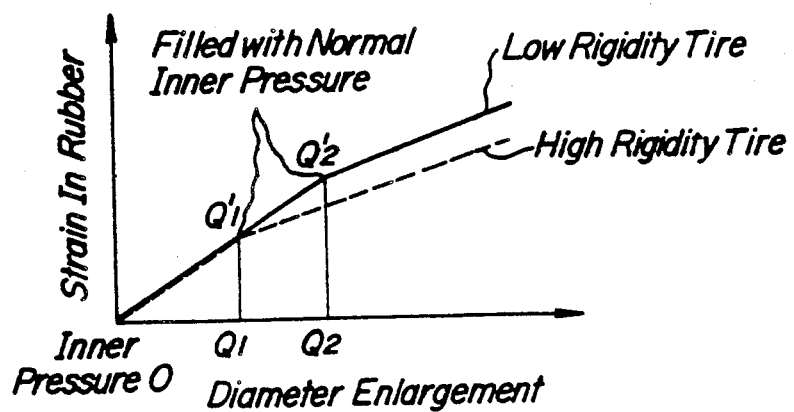

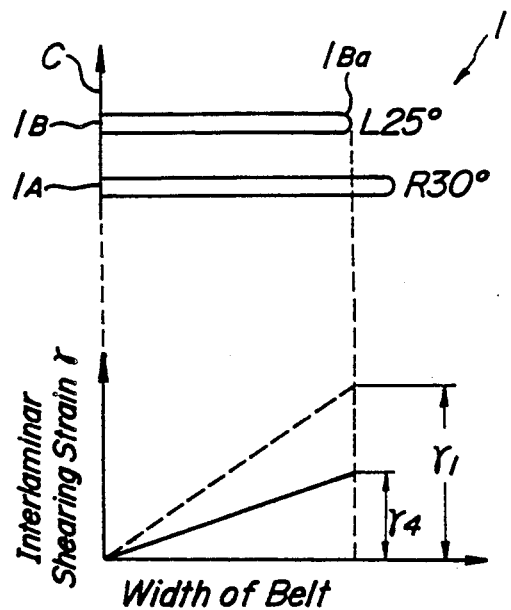
FIG._6a
FIG._6b
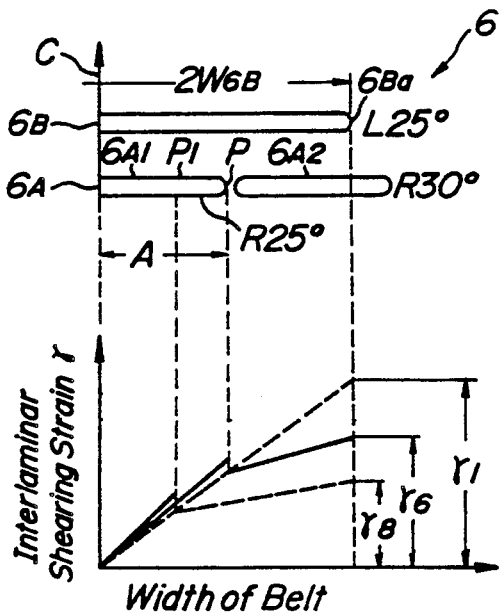
FIG._7a
FIG._7b

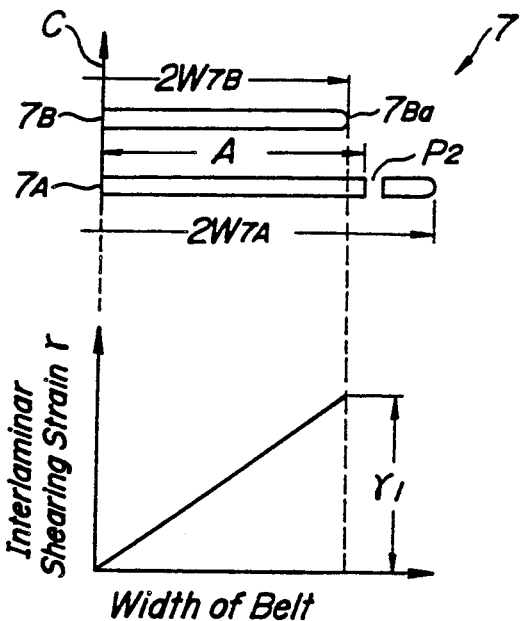
FIG.8a
FIG.8b
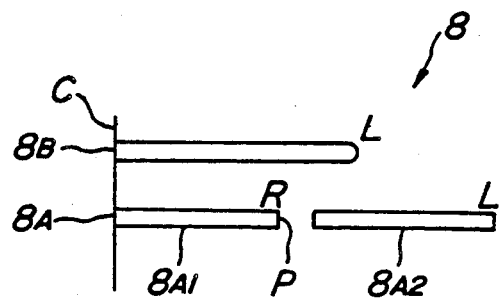
FIG.9

FIG.10a
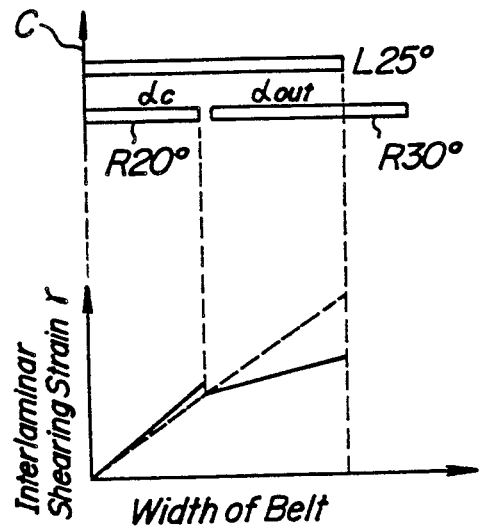
FIG.10b
FIG.11
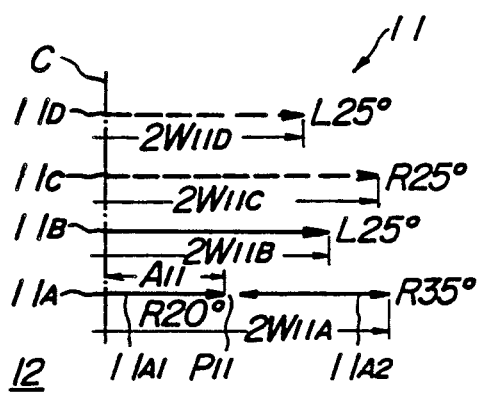

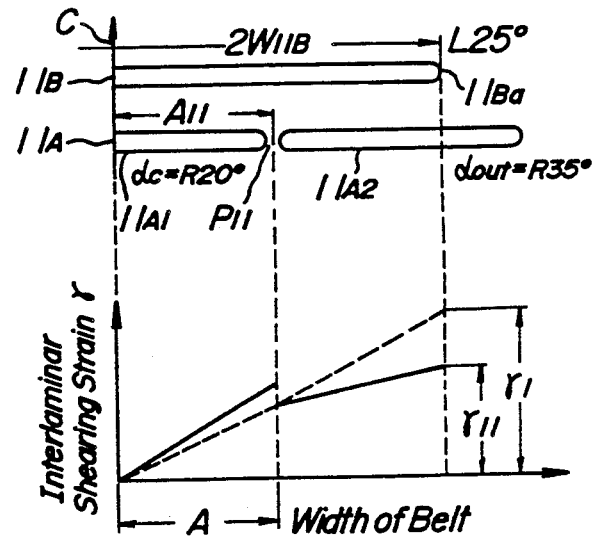
FIG_12a
FIG_12b
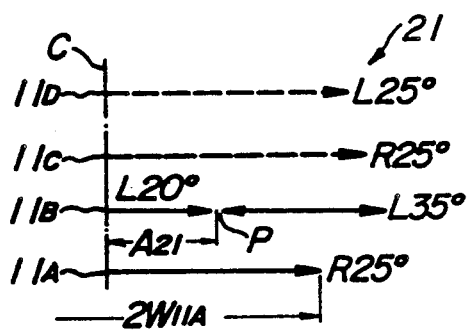
FIG_13
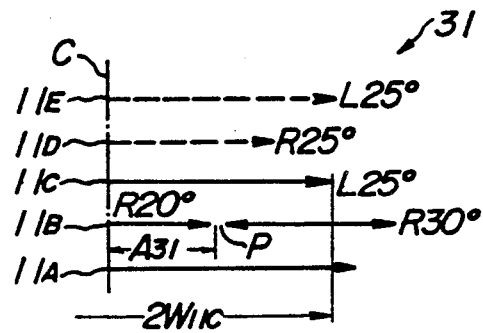
FIG_14

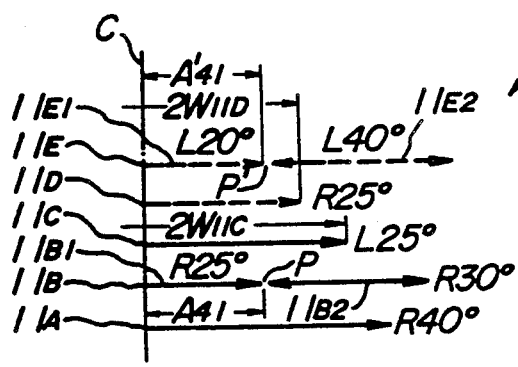
FIG_15
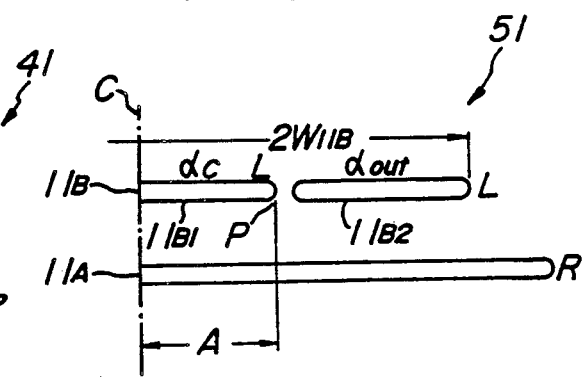
FIG_16
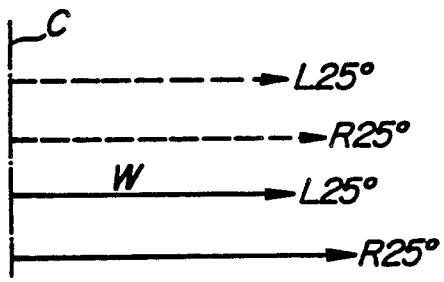
FIG_17
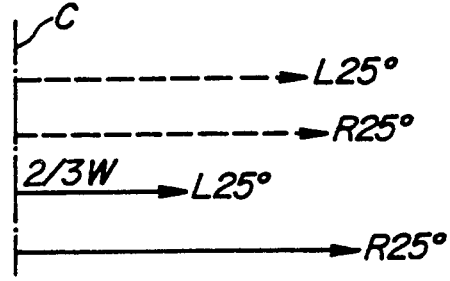
FIG_18
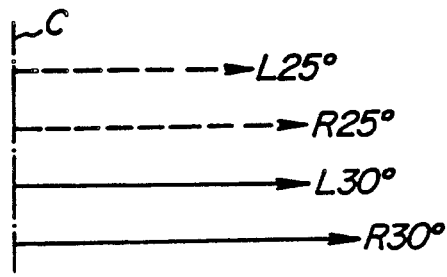
FIG_19

PNEUMATIC RADIAL TIRE WITH A DIVIDED BELT LAYER

BACKGROUND OF THE INVENTION

This invention relates to a pneumatic radial tire, for example, a heavy duty pneumatic radial tire having a particular belt construction. More particularly it relates to a tire improved in durability by reducing interlaminar shearing strains at ends of narrow belts among laminated belts whose cords intersect between the belts.

A construction of a conventional pneumatic radial tire is illustrated by way of example in FIG. 1 which is a sectional view of a right half of the tire taken along a plane including a rotating axis of the tire. As shown in FIG. 1, the tire comprises a pair of beads 13, a carcass 12 radially extending between the beads and anchored by the beads, a tread 14 located outward of the carcass and adapted to be in contact with a load, belt layers extending between the carcass 12 and the tread 14, and the like. As the invention mainly relates to belt layers, belt layers will be explained in more detail in the specification. A usual heavy duty pneumatic radial tire is constructed by laminating more than two belts as shown in FIG. 1. In order to make it easy to understand the invention, it will be explained referring to laminated belts made of two belts.

A construction of hitherto used belt layers is shown as typical example in FIG. 2a. In the drawing, reference numeral 1 denotes a laminated belt comprising a first belt layer 1 having a belt width 2W2, and a second belt layer 1 adjacent outward of the first belt layer and having a belt width 2WB narrower than the width 2WA. Cords of the first belt layer 1 are inclined in a manner with right ends being raised as viewed from a tread of the tire at angles 25° with circumferential directions. It is indicated in the drawings as "R 25° ". On the other hand, cords of the second belt layer 1B are inclined in a manner with left ends being raised as viewed from the tread at angels 25° with the circumferential directions. It is indicated in the drawings as "L 25° ". The cords of the first and second belt layers intersect with each other to form main reinforcing belts. The "main reinforcing belt" used herein is intended to mean "two adjacent laminated belt layers whose cords have the maximum strength among cords of all belt layers and the cords of the two belt layers intersect with each other with respect to circumferential directions". Widths of the first and second belt layers 1A and 1B are somewhat different and these belt layers are laminated with their cords intersecting with each other with respect to the circumferential directions, thereby maintaining the rigidity of the laminated belts to restrain circumferential elongations and diameter enlargement of the tire or to exhibit so-called hoop effect".

When a pneumatic radial tire is running, interlaminar shearing strains $\gamma$ occur at 2 caused by running in addition, to interlaminar shearing strains owing to the inflation air pressure. The interlaminar shearing strains indicated by "$\gamma$" are limited to the interlaminar shearing strains caused when the tire is running except the interlaminar shearing stains due to the filled air pressure. As shown in FIG. 2b, the interlaminar shearing strains $\gamma$ are distributed in a manner that the maximum value $\gamma1$ are is at a belt end 1BA of the second belt layer 1B having the narrower width and the strains are progressively decreased to the center c. With such a pneumatic radial tire, cracks 3 often occur at the belt ends 1Ba of the second belt layer 1B and grow between the belt layers at 2 into a serious fault.

In order to reduce the interlaminar shearing strains $\gamma$, arrangements of the belt layers have been proposed as shown in FIGS. 3a and 3b wherein like components are designated by the same reference numerals as those in FIG. 2a. In FIG. 3a, a width 2WB2 of a second belt layer 1B is narrower than the width 2B1 of the belt shown in FIG. 2a. In this case, the maximum interlaminar shearing strains $\gamma2$ of the second belt layer 1B are considerably decreased in comparison with the value $\gamma1$ shown in FIG. 2a (refer to broken lines in FIG. 3b). In FIG. 4a, angles $\theta$ of cords of all or part (adjacent two layers in this case) of the belt layers of the laminated belt layer 1 are relative large angles 30°. Interlaminar shearing strains $\gamma3$ between the belt layers at 2 are reduced in comparison with the strains $\gamma1$ in FIG. 2b whose cord angles are 25° (refer to broken lines in FIG. 4b). However, belt rigidities of the overall laminated belt 1 of the tires shown in FIGS. 3a and 4a are considerably reduced and the diameter enlargement is increased so that durability of the tires is lowered.

In more detail, with a tire whose rigidity of belt is lowered, as shown in FIG. 5, when the tire is filled with the normal inner pressure, an outer diameter elongation becomes larger to a point Q2 in comparison with the diameter enlargement Q1 of a tire whose rigidity of belt is high, so that strains of inner rubber of the tire become larger. Under such a condition, upon running of the tire the diameter enlargement is further developed as shown by a line rising from the points Q1' and Q2' to the right in FIG. 5. In general, the larger the diameter enlargement before use, the larger are the strains in the inner rubber of the tire caused by the diameter enlargement in running. Such large strains accelerate the deterioration of the rubber to lower the durability of the tire.

SUMMARY OF THE INVENTION

It is a primary object of the invention to provide an improved pneumatic radial tire which eliminates all the disadvantages of the prior art and whose interlaminar shearing strains of laminated belts in running are considerably decreased by restraining the diameter enlargement of the tire to the extent of the prior art tire, thereby restraining the occurrence of cracks at belt ends of the laminated belts to remarkably improve the durability of the tire.

The inventors of the present application have investigated the cause of faults due to crack, relations between belt widths and interlaminar shearing strains, relations between belt rigidities and diameter enlargements, and the like in various manner.

As a result, the following facts have been found. With the prior art tire as shown in FIG. 2a, the interlaminar shearing strains $\gamma$ between layers of laminated belts have the maximum value $\gamma1$ at belt ends 1Ba. However, by changing cord angles of the first belt layer 1A and increasing the angles of the cords with the circumferential directions of the tire from R 25° to R30° . the interlaminar shearing strains $\gamma$ are considerably lowered from Y1 to Y4 as shown in FIG. 6b. However, the rigidity of the belts is largely lowered but the diameter enlargement is increased. Namely, decrease in interlaminar shearing strain and restraint of the diameter enlargement are in an opposite relation that is, an incompatible relation with each other.

Moreover, it has been found that interlaminar shearing strains γ at the belt end 6Ba of the second belt layer 6B are considerably decreased to the shearing strains γ6 between layers as shown in FIG. 7b by constructing the laminated belts in the following manner. Namely, as in laminated belts 6 comprising a first belt layer 6A and a second belt layer 6B as shown in FIG. 7a, the first belt layer 6A is divided at locations P spaced apart in width directions from a center C of the laminated belt 6 by a distance A into a center portion 6A1 and both Side portions 6A2, while cord angles θ at side portions 6B2 are increased to R 30°.

Moreover, if the location P is positioned much nearer to the center c in comparison with the belt width 2W6B of the second belt layer 6B, for example at P1 as shown in FIG. 7a, interlaminar the shearing strains γB at the belt ends 6Ba of the second belt layer 6B are considerably small. However, the belt width at the center portion 6A1 forming the part of the main reinforcing belt becomes too narrow so that the rigidity of the belts becomes insufficient, with the result that a sufficient hoop effect cannot be obtained to permit large diameter enlargement.

Further, if the location P2 is positioned as shown in FIG. 8a, the interlaminar shearing strains γ at belt ends 7Ba of the second belt layer 7B have nothing to do with the position P for dividing the first belt layer 7A. In more detail, with the laminated belts 7 comprising the first and second belt layers 7A and 7B, the dividing position P2 of the first belt layer 7A is spaced apart by A from the center c of the first belt layer 7A and positioned on outer side of the end of the second belt layer 7B having the narrower width 2W7B. In other words, the effect for reducing the interlaminar shearing strains cannot be obtained unless the divided position P is positioned inside the belt end 7Ba of the second belt layer 7B. In order to achieve the effect, a relation A<W7B is necessary.

Moreover, it has been found that it is preferable for the divided belt layer to have cords in the same directions at the center portion and both the side portions. The reason is that the rigidity of the belt is maintained at a high level by the intersections of the cords of the adjacent belt layers in different directions. As shown in FIG. 9, if the cords of the center portion 8A1 and both the side portions 8A2 of the divided first belt layer 8A are different in cord direction as R and L, cords of both the sides 8A2 and the second belt layer 8B adjacent thereto are both in the same direction L. Therefore, there are portions of adjacent layers in which their cords do not intersect so that the circumferential belt rigidity of the laminated belts is reduced so that diameter enlargement of the tire is easily obtained.

Further, it has been found that it is desirable that the cord angles αout of both the side portions are larger than the cord angles αc of the center portion. The reason is that the cord angles αc at the center portion would restrain the diameter enlargement of the tire as shown in FIG. 10b, so that the cord angles αc are preferably as small as possible. On the other hand, the cord angles αout at both the side portions is preferable to be larger in order to reduce the interlaminar shearing strains γ. In other words, the following relation is preferable.

$$\alpha c < \alpha out$$

The inventors further continued the investigation and they arrived the invention. The invention lies in a pneumatic tire including a carcass anchored to a pair of beads, and laminated belts having at least two belt layers circumferentially extending outside of a crown portion of said carcass and consisting of cords intersecting between adjacent belt layers. One of said laminated belts is divided in circumferential directions of the tire into a center portion and two side portions. A divided width A of the divided belt from its center to its divided points has a relation $$W/4 \leq A < W$$

where W is a half of a width of another laminated belt. Directions of cords of the center portion and the side portions of the divided belt are substantially the same, while cord angles αout and of the cords of the side portions of the divided belt with the circumferential directions are larger than cord angles αc of the center portion of the divided belt with the circumferential directions.

In this case, "directions of cords are substantially the same" means that cords at the center portion and both the side portions are both directed in directions whose right ends are raised as viewed from the tread, or are both in directions whose left ends are raised as viewed from the tread.

Moreover, the reason why the relation $W/4 \leq A < W$ is defined in the invention is as follows. If the divided width A is more than W which is half of the belt width 2W, the effect of decrease in interlaminar shearing strain is lost. On the other hands, if the divided width A is less than $\frac{1}{4}W$, the rigidity of the belts is lowered to make large the diameter enlargement so that the effect of the invention cannot be accomplished.

In the running of a tire, large interlaminar shearing strains occur at belt ends of narrower belt layers between layers of the laminated belts. According to the invention, however, interlaminar shearing strains are considerably reduced at the belt ends of the belt layers having narrower widths as shown in FIG. 7b. Such an effect of the invention results from the features of the invention in that the divided width A of the belt layer is within the predetermined relation to the belt width 2W of the belt layer having the narrower width and the cords of the divided belt layer at the center portion and both the side portions are directing the same directions and the cord angles αout at both the side portions are larger than the cord angles αa at the center portion of the cord layer. Therefore, the fatigue of the rubber between the cord layers is reduced so that cracks are prevented. On the other hands, the belt width of the center portion of the divided belt is sufficient so that the rigidity of the belt is enough to restrain the diameter enlargement of the tire.

In order that the invention may be more clearly understood, preferred embodiments will be described, by way of example, with reference to the accompanying drawings.

BRIEF DESCRIPTION OF THE DRAWINGS

FIGS. 2a, 3a and 4a are schematic views illustrating concepts of main parts of laminated belts of the prior art;

FIGS. 2b, 3b and 4b are graphs illustrating operations corresponding to the concepts shown in FIGS. 2a–4a;

FIG. 5 is a graph illustrating a relation between strains in rubber between layers and diameter enlargement of the prior art;

FIGS. 6a, 7a and 8a and 9 and 10a are schematic views for explaining the basic idea of function of belt layers in the tire according to the invention;

FIGS. 6b, 7b and 8b and 10b are graphs illustrating the function and effect of the tire shown in FIGS. 6a–8a and 9 and 10a;

FIG. 11 is a view illustrating the idea of the laminated belts according to the invention;

FIG. 12a is a view illustrating the concept of the main part of the belts shown in FIG. 11;

FIG. 12b is a graph illustrating the function of the belt shown in FIG. 12a;

FIGS. 13, 14, 15 and 16 are views illustrating the concept of the laminated belts of second to fifth embodiments of the invention;

FIGS. 17, 18 and 19 are views illustrating concepts of comparative examples 1–3 in tests of tires.

DESCRIPTION OF THE PREFERRED EMBODIMENTS

Figure 1:
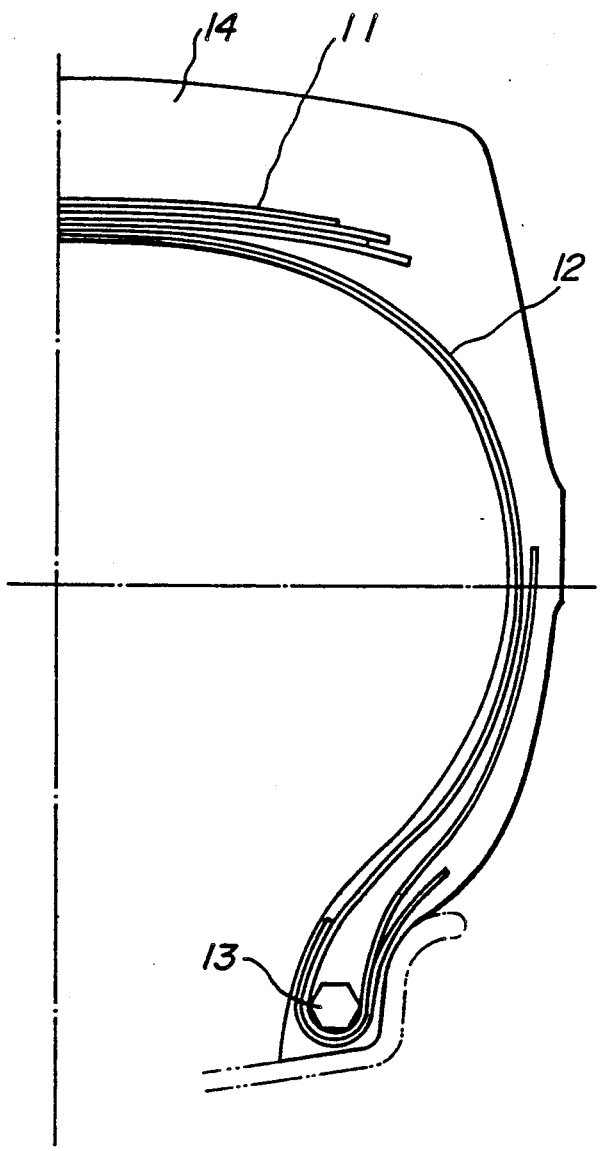
FIG. 1 is a sectional view of a radial tire of the prior art.

FIGS. 11 and 12a and 12b are schematic views and a graph illustrating one embodiment of the belt construction of a pneumatic radial tire according to the invention.

First, the construction of the belt layers will be explained. In FIG. 11, reference numeral 11 denotes laminated belts of a pneumatic radial tire (not shown) which is of size of 18.00 R25 for construction vehicles. The pneumatic tire comprises a radial carcass 12 having radially extending cords anchored by a pair of beads, laminated belts 11 of four layers extending in circumferential directions of the tire outside of a crown portion of the carcass 12. The laminated belts 11 consist of first to fourth belt layers 11A to 11D (shown in solid and dash lines) from the side of the carcass 12 to a tread. FIG. 11 shows belt widths 2W11A–2W11D of the belt layers, directions of cords of the belt layers, and angles αA–αD of the directions of the cords with the circumferential directions of the tire.

In this embodiment, the first and second belt layers 11A and 11B each comprise rubber coated steel cords (shown in solid lines as used in the same meaning in the following drawings) and whose construction is 1=3+9+9=4 (referred to "D construction cord" hereinafter) whose number of cords is 16 per 5 cm.

Each of the third and fourth belt layers 11c and 11D each comprises rubber coated high elongation steel cords (shown in dash lines as used in the same meaning in the following drawings) and whose construction is 3×7 (referred to "E construction cord" hereinafter) whose number of cords is 16 per 5 cm. In other words, the laminated belts 11 consist of the two layers of the D construction cords and the two layers of the E construction cords.

The cords of the first and second belt layers 11A and 11B adjacent to each other are directing in directions R and L and intersect between the layers in different directions as shown in FIG. 12. Therefore, the main reinforcing belts are the first and second belt layers 11A and 11B. The firs belt layer 11A is divided into two parts on either side so that the first belt layer 11A comprises a center portion 11B and both side portions 11A2.

A divided width A11 of the first belt layer 11A from a center line c of the laminated belts 11 to the divided position P11 of the first belt layer 11 has a following relation to a belt width 2W11B of the second belt layer 11B having a narrower width.

$$W11B/4 \leq A11 < W11B$$

Angles αout of the directions R of the cords of both the side portions 11A2 of the divided first belt layer 11A with the circumferential directions of the tire is R 35°. On the other hand, angles αc of the direction R of the cords of the center portion 11A1 of the divided first belt layer 11A with the circumferential directions of the tire is R 20°. In other words, the cord directions R of the center portion 11A1 and both the side portions 11A2 are the same directions R, and the cord angles αc (R 20°) is less than the cord angles αout (R 35°) of both the side portions 11A2. Therefore, the center portion 11A1 has a belt width twice the divided width A11 so as to retain sufficient rigidity of the belts to restrain the diameter enlargement of the tire sufficiently.

The cord directions of both the side portions 11A2 are the same as the cord directions of the center portion 11A1 and have the cord angles αout 35° larger than the cord angles αc 20° of the center portion. Therefore, as shown in FIG. 12b the interlaminar shearing strains γ11 at belt ends 11B of the second belt layer 11B are considerably reduced from the interlaminar shearing strains γ1 of the prior art and the fatigue of the rubber between the layers is reduced so that cracks are restrained. The construction other than the above is substantially the same as that of the conventional pneumatic radial tire.

Second to fifth embodiments of the invention will be then explained, wherein like components will be designated by the same reference numerals as those in the first embodiment.

Referring to FIG. 13 illustrating the second embodiment of the invention, first and second belt layers 11A and 11B as the main reinforcing belts of laminated belts 21 are quite different from those of the first embodiment. The first belt layer 11A has a narrow width, and the second belt layer 11B is divided at a divided point P spaced by a divided width A21 from a center c into a center portion 11B1 and side portions 11B2. Cord angles αc and αout of the center portion 11B1 and the side portions 11B2 are L 20° and L 35°, respectively.

FIG. 14 illustrates the third embodiment of the invention. In the embodiment, laminated belts 31 consist of first, second and third belt layers 11A, 11B and 11C of three belt layers having the D construction cords, and fourth and fifth belt layers 11D and 11E of two belt layers having the E construction cords. The second and third belt layers 11B and 11C are the main reinforcing belts in this case. The third belt layer 11C has a narrow width 2W11C. The second belt layer 11B is divided at a divided point P spaced by a divided width A31 from a center c into a center portion 11B1 and side portions 11B2. Cord angles αa and αout of the center portion 11B1 and the side portions 11B2 are R 20° and R 30°, respectively.

Referring to FIG. 15 illustrating the fourth embodiment of the invention, laminated belts 41 consist of first, second and third belt layers 11A, 11B and 11C of three belt layers having the D construction cords, and fourth and fifth belt layers 11D and 11E of two belt layers having the E construction cords. The second and third belt layers 11B and 11C are the main reinforcing belts.

The third belt layer 11C has a narrow width W11C. The second belt layer 11C is divided at a divided point P spaced by a divided width A from a center c into a center portion 11B1 and side portions 11B2. At the same time, the fourth and fifth belt layers 11D and 11E are the two belt layers having E construction cords, and the fifth belt layer 11E is divided at a divided point P' into a center portion 11E: and side portions 11E2. Cord directions and cord angles of the respective belt layers are shown in FIG. 15.

Referring to FIG. 16 illustrating the fifth embodiment of the invention, with first and second belt layers 11A and 11B as the main reinforcing belts of laminated belts 51, the second belt layer 11B having a narrow width is divided at divided positions P into a center portion 11B1 and side portions 11B2.

Tires of four kinds (according to the invention and comparative examples 1-3) were prepared and ascertained the effects of the invention, which will be explained hereinafter.

Sizes of these tires were 18.00 R 25. The tires of the invention used for the test were those having the belt construction shown in FIG. 11. The tires of the comparative examples were those having the belt constructions shown in FIGS. 17, 18 and 19, respectively, having no divided belt layers. The tire of the comparative example 1 shown in FIG. 17 has the belt construction of the prior art and whose cord directions and cord angles of the first belt layer are R 25°. The tire of the comparative example 2 shown in FIG. 18 has a second belt layer 11B having a narrow width. With the tire of the comparative example 3 shown in FIG. 19, cord angles of the first and second belt layers 11A and 11B are increased. The tires of the comparative examples 1, 2 and 3 are substantially similar to the tire shown in FIG. 11 other than those above described.

The test was carried out on diameter enlargement and durability. In the test of the diameter enlargement, enlarged amounts after filled with inner pressure were measured at centers c of the tires, shoulder portions and intermediate positions at locations one fourth of the tread widths. Amounts of the diameter enlargements were measured when the inner pressure was filled from 0 to 7 kgf/cm².

Figure 20:
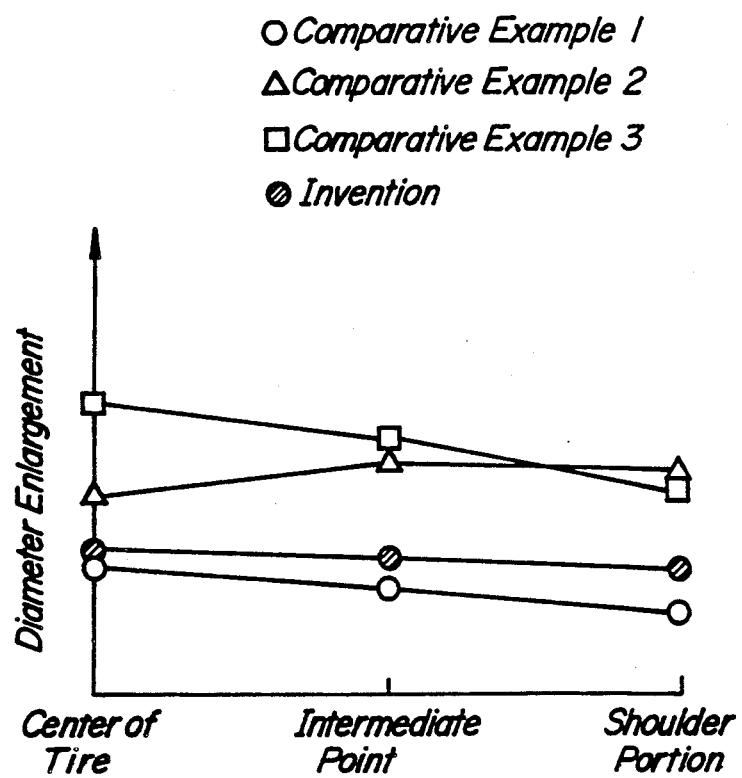
FIG. 20 is a graph illustrating the effect of the invention.

Results of the test are shown in FIG. 20. It is desirable for the diameter enlargement to be smaller. Results of the tires of comparative examples are shown by marks O, △ and □ results of the tires of the invention are shown by marks ⦿. From the results, the tires according to the invention exhibit small diameter enlargement which is substantially the same extent as that of the tire of the comparative example 3. Moreover, interlaminar shearing strains γ11 of the tires according to the invention are considerably reduced in comparison with tires of the prior art as shown in FIG. 12b.

Further, a durability test was effected by the use of a usual drum testing machine in a laboratory room under the usual condition of the drum test. A tire was urged against a drum of the testing machine which was then driven to rotatively drive the tire until faulty cracks occurred in laminated belts of the tire. The running distance when the cracks occurred was determined. Results were indicated in index assuming that the running distance of the tire of the comparative example 1 (prior art) when cracks occurred is 100. Durability of the comparative examples were 100, 85 and 5, while durability of the tire according to the invention was 115 indicating the considerable improvement of the durability.

As can be seen from the above explanation, the tire according to the invention can restrain the diameter enlargement to an extent substantially equal to that of the prior art tires and considerably reduce interlaminar shearing strains of belt layers, thereby preventing cracks at belt ends to considerably improve the durability of the tire.

It is further understood by those skilled in the art that the foregoing description is that of preferred embodiments of the disclosed tires and that various changes and modifications may be made in the invention without departing from the spirit and scope thereof.

What is claimed is:

1. A pneumatic radial tire including a carcass anchored to a pair of beads, a tread, and laminated belts including at least two belt layers circumferentially extending outside of a crown portion of said carcass and consisting of steel cords intersecting between adjacent belt layers at acute angles with circumferential directions of the tire, wherein one of said laminated belts is divided substantially in close adjacent relation along circumferential directions of the tire into a center portion and two side portions, a divided width A of the divided belt from the equatorial plane of the center portion to a side edge of said center portion having a relation.

$$W/4 \leq A < W$$

where, M is a half of a width of another laminated belt which is radially adjacent the divided belt and different in direction of cord inclination from that of the divided belt, and directions of steel cords of the center portion and the side portions of the divided belt are substantially the same, while cord angles $\alpha_{out}$ of the steel cords of the side portions of the divided belt with respect to the circumferential directions of the tire are larger in magnitude than cord angles $\alpha_c$ of the center portion of the divided belt with the circumferential directions and in a relation $5° < \alpha_{out} - a_c \leq 15°$.

2. A tire as set forth in claim 1, wherein said laminated belts are first, second, third and fourth belt layers from radially inside to outside, and the steel cords of the first and second belt layers intersect with each other and have a maximum strength among cords of all belt layers, and wherein the second belt layer has a width narrower than a width of the first belt layer and the first belt layer is divided.

3. A tire as set forth in claim 2, wherein the center and side portions of the first layer and second, third and fourth belt layers have cord angles R 20°, R 35°, L 25°, R 25° and L 25°, respectively, where R or L is added before angles of the cords with the circumferential directions of the tire when the cords are inclined in a manner that right or left ends of the cords are raised as viewed from said tread of the tire.

4. A tire as set forth in claim 1, wherein said laminated belts are first, second, third and fourth belt layers from radially inside to outside, and the steel cords of the first and second belt layers intersect with each other and have a maximum strength among cords of all belt layers, and wherein the first belt layer has a width narrower than a width of the second belt layer and the second belt layer is divided.

5. A tire as set forth in claim 4, wherein the first belt layer, the center and side portions of the second belt layer and third and fourth belt layers have cords angles R 25°, L 20°, L 35°, R 25° and L 25°, respectively, where R or L is added before angles of the cords with the circumferential directions of the tire when the cords are inclined in a manner that right or left ends of the cords are raised as viewed from said tread of the tire.

6. A tire as set forth in claim 1, wherein said laminated belts are first, second, third, fourth and fifth belt layers from radially inside to outside, and the steel cords of the second and third belt layers intersect with each other and have a maximum strength among cords of all belt layers, and wherein the third belt layer has a width narrower than a width of the second belt layer and the second belt layer is divided.

7. A tire as set forth in claim 6, wherein the first belt layer, the center and side portions of the second belt layer and the third, fourth and fifth belt layers have cord angles R 40°, R 20°, R 30°, L 25°, R 25° and L 25°, respectively, where R or L is added before angles of the cords with the circumferential directions of the tire when the cords are inclined in a manner that right or left ends of the cord are raised as viewed from said tread of the tire.

8. A tire as set forth in claim 6, wherein the cord of the fourth and fifth belt layers comprise high elongation steel cords that intersect with each other, and wherein the fourth belt layer has a width narrower than a width of the fifth belt layer and the fifth belt layer is divided.

9. A tire as set forth in claim 8, wherein said first belt layer, the center and side portions of the second belt layer and third and fourth belt layers and the center and side portions of the fifth belt layer have cord angles R 40°, R 25°, R 30°, L 25°, R 25°, L 20° and L 40°, respectively, where R or L is added before angles of the cords with the circumferential directions of the tire when the cords are inclined in a manner that right or left ends of the cord are raised as viewed from said tread of the tire.

10. A tire as set forth in claim 1, wherein said one of the laminated belts has a width narrower than a width of another laminated belt.

11. A tire as set forth in claim 10, wherein said narrow laminated belt is arranged radially outwardly of another laminated belt.

12. A tire as set forth in claim 1, wherein angles of all the belt layers are between 20°–40° with respect to the tire circumferential direction.

13. A tire as set forth in claim 1, wherein angles of steel cords in the center portion of the divided belt are within a range of 20°–25°, and angles of steel cords of the other layers are within a range of 25°–40° with respect to the tire circumferential direction.

* * * * *